United States Patent
Abe et al.

(10) Patent No.: US 6,836,545 B1
(45) Date of Patent: Dec. 28, 2004

(54) COMMUNICATION SYSTEM, EXCHANGE AND COMMUNICATION HOLDING CONTROL METHOD

(75) Inventors: Takahiro Abe, Koriyama (JP); Shinji Saitou, Koriyama (JP)

(73) Assignee: Hitachi Telecom Technologies, Ltd., Koriyama (JP)

( * ) Notice: Subject to any disclaimer, the term of this patent is extended or adjusted under 35 U.S.C. 154(b) by 0 days.

(21) Appl. No.: 09/270,676

(22) Filed: Mar. 16, 1999

(30) Foreign Application Priority Data

Mar. 16, 1998 (JP) .......................................... 10-065142

(51) Int. Cl.$^7$ ............................................... H04M 1/00
(52) U.S. Cl. ....................... 379/393; 379/162; 379/164
(58) Field of Search .................................. 379/393, 157, 379/162, 164, 352

(56) References Cited

U.S. PATENT DOCUMENTS

| | | | |
|---|---|---|---|
| 5,095,504 A | * | 3/1992 | Nishikawa et al. ......... 379/393 |
| 5,546,454 A | * | 8/1996 | Harrington .................. 379/393 |

* cited by examiner

Primary Examiner—Forester W. Isen
Assistant Examiner—Jefferey Harold
(74) Attorney, Agent, or Firm—Antonelli, Terry, Stout & Kraus, LLP

(57) ABSTRACT

Each of multifunctional telephones has a common hold button for accepting a hold/hold release instruction of a communication partner (extension) under transfer communication; a central processing equipment controls each part of a private branch exchange so that the transfer communication partner concerned is held in accordance with a hold instruction from a multifunctional telephone under transfer communication; the information of a hold target (extension) is registered into a hold information registration area; in accordance with a hold release instruction from a multifunctional telephone holding a communication partner, the information of the communication partner specified by the instruction is searched from the hold information registration area; and the holding of the communication partner specified by the searched information is released to connect the communication partner to the multifunctional telephone concerned, whereby the communication partner (extension) under transfer communication can be held to communicate with another extension.

4 Claims, 8 Drawing Sheets

COMMUNICATION SYSTEM, EXCHANGE AND COMMUNICATION HOLDING CONTROL METHOD

BACKGROUND OF THE INVENTION

1. Field of the Invention

The present invention relates to a communication system including an exchange and telephones accommodated in the exchange concerned, and particularly to a communication holding control technique for use in a communication system containing a private branch exchange and a plurality of multifunctional telephones accommodated in the private branch exchange.

2. Description of Related Art

A communication system containing a private branch exchange and a plurality of telephones and multifunctional telephones (telephones having call hold/transfer functions, an abbreviated dialing function, etc.) accommodated in the private branch exchange concerned have been widely popular in working places, etc.

The following procedure has been used in such a conventional communication system in order to hold a calling partner and to transfer a telephone call from the calling partner.

Upon pushing a transfer button of a multifunctional telephone, an exchange cuts off a communication path between the multifunctional telephone and an external telephone and connects both the multifunctional telephone concerned and the external telephone (public line) to a hold tone source to keep the external telephone under communication in a hold state.

When the multifunctional telephone accepts an extension number through a dialing operation, the exchange connects the multifunctional telephone to a ring-back tone source and rings a telephone (extension) specified by the extension number and then waits for a response from the telephone.

Upon receiving the response from the telephone (extension) (that is, when the handset of the telephone is lifted up), the exchange connects the telephone concerned and the multifunctional telephone to each other to establish a communication path therebetween. This state, that is, the state that the present communication partner (public line) is held to make a communication with another communication partner (extension) is hereinafter referred to as "transfer communication".

SUMMARY OF THE INVENTION

In the conventional communication system, it has been impossible to hold a transfer communication partner. That is, only one communication partner under communication can be held for each of the multifunctional telephones accommodated in the private branch exchange. Therefore, the conventional communication system uses the following procedure when a user of the multifunctional telephone holds a communication partner under communication to perform a transfer communication with another communication partner (first transfer communication partner) and then makes a communication with another communication partner (second transfer communication partner) during the transfer communication with the first transfer communication partner.

First, the operator of the multifunctional telephone requests the operator of the first transfer communication partner through the communication channel between the multifunctional telephone and the first transfer communication partner to hang up, whereby the first transfer communication partner is hanged up.

By the hang-up operation of the first transfer communication partner, the multifunctional telephone returns to the communication with the communication partner under hold. The operator of the multifunctional telephone holds the communication partner again, and then dial the extension number of a desired transfer communication partner (second transfer communication partner) to call the transfer communication partner concerned.

The conventional communication system has the following problems because the above procedure is needed when the operator of the multifunctional telephone holds a communication partner to make a transfer communication with a first transfer communication partner and then makes a communication with a second transfer communication partner during the transfer communication with the first transfer communication partner.

(1) Much time is needed for the operation because the user of the first transfer communication partner is requested to hang up.

(2) It is difficult to judge whether the first transfer communication partner is hanged up.

(3) The communication returns to that with the communication partner under hold every time the transfer communication partner is changed (output of a hold tone to the communication partner under hold is stopped), and this causes great confusion.

The present invention has been implemented in view of the foregoing circumstances, and has an object to enable the holding operation of a plurality of communication partners for each of telephones accommodated in an exchange.

In order to solve the above problems, according to the present invention, a communication system comprises an exchange and a plurality of telephones accommodated in the exchange, wherein each of the telephones includes hold instruction accept means for accepting a hold instruction of an operator and hold releasing instruction accept means for accepting a hold releasing instruction of the operator, and the exchange includes hold control means for holding, in accordance with the hold instruction from the telephone under communication, a communication partner of the telephone concerned hold information registration means for registering in a hold information register area information of the communication partner which is held in accordance with the hold instruction from the telephone, and hold release means for searching, in accordance with a hold release instruction from the telephone which holds the communication partner, information of a communication partner specified by the hold release instruction from the hold information registration area and releasing the hold of the communication partner specified by the searched information, thereby connecting the communication partner to the telephone.

According to the present invention, information of the communication partner under hold is registered in the hold information registration area, and the hold release processing is carried out on the basis of the hold information registration area. As described above, the information of the communication partner under hold is managed in the hold information registration area, so that each telephone accommodated in the exchange can hold a plurality of communication partners. That is, each telephone can communicate with a communication partner while holding another transfer communication partner.

In the present invention, a plurality of common hold buttons may be provided as the hold instruction accept means and the hold release instruction accept means, and there may be provided a plurality of display means each of which is provided in association with each of the common hold buttons, accepts a hold instruction and is turned on when the corresponding common hold button is pushed, and accepts a hold release instruction and is turned off when the corresponding common hold button is pushed during the turn-on state thereof.

In this case, the hold information registration means associates the information of the communication partner held in accordance with the hold instruction from the telephone with the common hold button accepting the hold instruction concerned to register the information in the hold information registration area.

In accordance with the hold release instruction from the telephone, the hold release means searches from the hold information registration area the information corresponding to the common hold button accepting the hold release instruction, and releases the hold of the communication partner specified by the searched information, thereby connecting the communication partner to the telephone.

DETAILED DESCRIPTION OF THE PREFERRED EMBODIMENTS

Preferred embodiments according to the present invention will be described hereunder with reference to the accompanying drawings.

Figure 1:
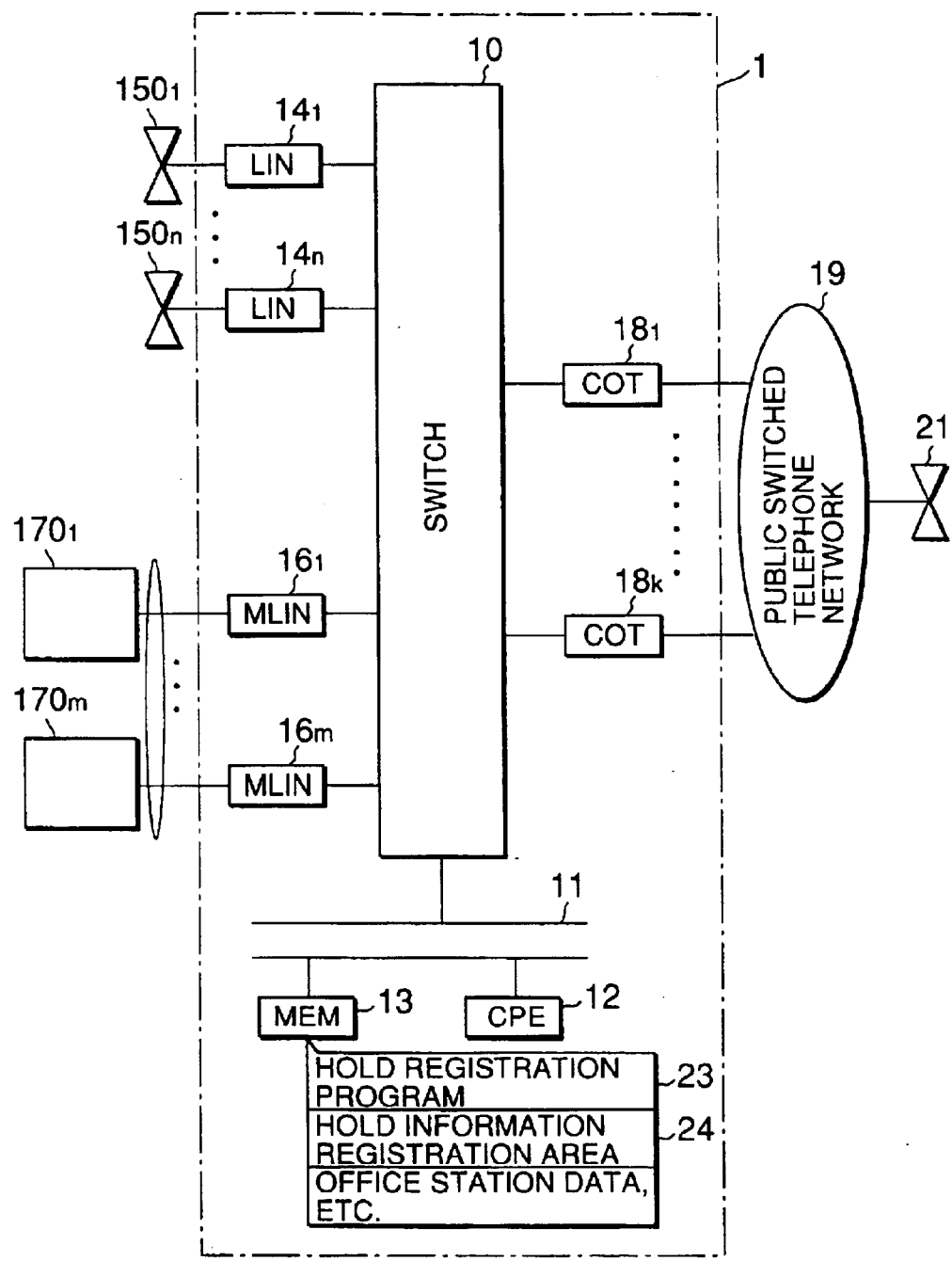
FIG. 1 is a diagram showing a communication system to which an embodiment of the present invention is applied.

FIG. 1 is a diagram showing a communication system to which an embodiment of the present invention is applied.

As shown in FIG. 1, the communication system of this embodiment comprises a private branch exchange 1, extension telephones $150_1$ to $150_n$ accommodated in the private branch exchange 1, and multifunctional telephones $170_1$ to $170_m$ having hold/transfer functions which are also accommodated in the private branch exchange 1.

First, the private branch exchange 1 will be described.

The private branch exchange 1 includes a switch 10 for switching a communication path to another, line interface circuit (LIN) $14_1$ to $14_n$ for connecting the extension telephones $150_1$ to $150_n$ to the communication channel switch 10 respectively, multifunctional telephone line interface circuit (MLIN) $16_1$ to $16_m$ for connecting the multifunctional telephones $170_1$ to $170_m$ to the switch 10 respectively, central office trunks (COT) $18_1$ to $18_k$ for connecting a public switched telephone network 19 to the switch 10, a central processing equipment (CPE) 12 and a main memory (MEM) 13.

Here, the central processing equipment 12 and the main memory 13 are connected to the switch 10 through a control bus 11. Each external telephone 21 is connected to the public switched telephone network 19.

The main memory 13 stores programs for services such as an exchange work, etc., system established data, control data, a hold information registration area 24 for managing the telephones (the extension telephones $150_1$ to $150_n$, the multifunctional telephones $170_1$ to $170_m$) accommodated in the private branch exchange 1 in the communication partners under hold, and a hold registration program 23 for registering extension information of the telephones under hold (the extension telephones $150_1$ to $150_n$, the multifunctional telephones $170_1$ to $170_m$) into the hold information registration area 24.

The central processing equipment 12 reads out and executes the programs stored in the main memory 13 to control each constituent element of the private branch exchange 1 and each telephone accommodated in the private branch exchange 1, and it performs various services such as the exchange work, etc., and hold information registration processing of registering hold information into the hold information registration area 24. The central processing equipment 12 releases the holding of the telephones accommodated in the private branch exchange 1 in the communication partners under hold in accordance with the hold information registration area 24 stored in the main memory 13.

The switch 10 is put under the control of the central processing equipment 12, and the exchange work, the connection/cut-off work, etc. between the office trunks $18_1$ to $18_k$, the line interface circuit $14_1$ to $14_n$ and the multifunctional telephone line interface circuit $16_1$ to $16_m$ are performed.

The line interface circuit $14_1$ to $14_n$ are put under the control of the central processing equipment 12 to control the call initiation/call reception of the extension telephones $150_1$ to $150_n$ which are respectively connected to the line interface circuit $14_1$ to $14_n$.

The multifunctional telephone line interface circuit $16_1$ to $16_m$ are put under the control of the central processing equipment 12 to not only control the call initiation/call reception of the multifunctional telephones $170_1$ to $170_m$ which are respectively connected to the multifunctional telephone line interface circuit $16_1$ to $16_m$, but also control various services of the multifunctional telephones $170_1$ to $170_m$ such as the transmission of the hold/hold release instructions accepted by common hold buttons 37 (which will be described later) to the central processing equipment 12, display of turn-on/turn-off of the LED (display means) 37a corresponding to each of the common hold buttons 37, etc.

Next, the extension telephones $150_1$ to $150_n$ will be described.

Each of the extension telephones $150_1$ to $150_n$ is basically the same as an analog two-wire type extension telephone which has been hitherto used. In the following description, the detailed description on the internal structure thereof is omitted, and only the construction of the panel face will be described.

Figure 2:
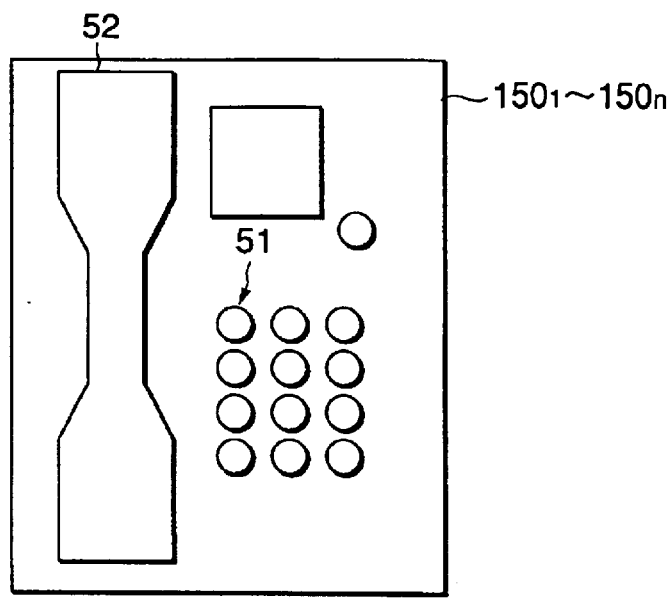
FIG. 2 is a diagram showing a panel face of each extension telephone $150_1$ to $150_n$.

FIG. 2 is a diagram showing the panel face of each of the extension telephones $150_1$ to $150_n$.

Reference numeral 51 represents a dial button which accepts an office station number and an extension number, and reference numeral 52 represents a receiver for communication.

Next, the multifunctional telephones $170_1$ to $170_m$ will be described.

Each of the multifunctional telephones $170_1$ to $170_m$ is an extension telephone which is designed to provide various services such as office line-number automatic transmission, abbreviated dial, hold/transfer, etc. It contains a calculator such as a microcomputer or the like, and provides various services to an operator under the control of the multifunctional telephone line interface circuit $16_1$ to $16_m$.

Figure 3:
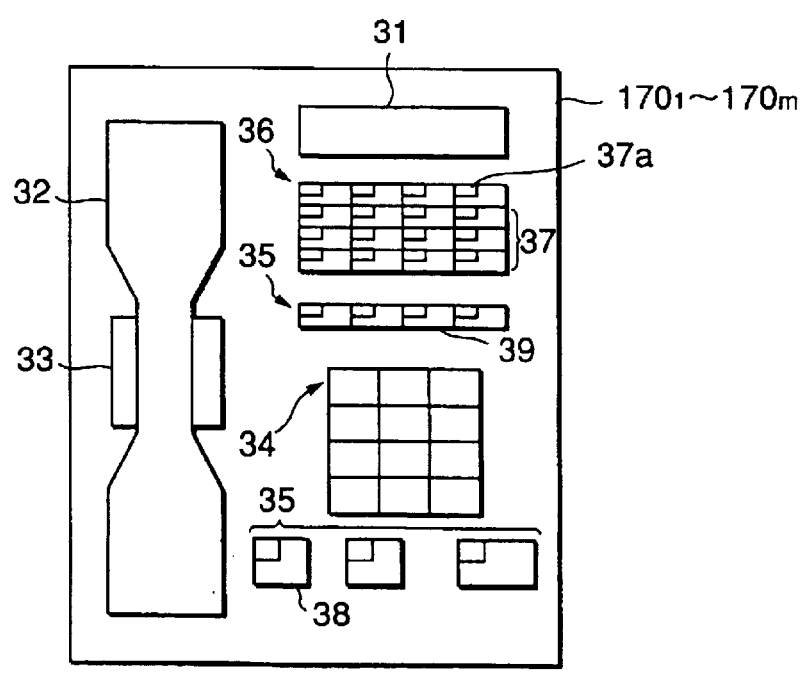
FIG. 3 is a diagram showing a panel face of each multifunctional telephone $170_1$ to $170_m$.

FIG. 3 is a diagram showing the panel face of each of the multifunctional telephones $170_1$ to $170_m$.

Reference numeral 31 represents a display unit for displaying a message, reference numeral 32 represents a hand set for communication, reference numeral 33 represents a speaker, reference numeral 34 represents dial buttons used to accept an office line number and an extension number, reference numeral 35 represents fixed function buttons to provide predetermined services, and reference numeral 36 represents variable function buttons which can change the services to be provided by changing the data registered in the microcomputer or the main memory 13. Each of the variable function buttons 36 is provided with a LED (display means), whereby the communication state can be displayed.

One of the plural fixed function buttons 35 provided onto the panel face is allocated to a call-reception button 38 for displaying "call reception", and another of the fixed function buttons 35 is allocated to a transfer button used when the external telephone 21 under communication is held/transferred.

Some of the plural variable function buttons 36 provided on the panel face are allocated to the common hold buttons 37. Each of the LEDs 37a allocated to the common hold buttons 37 is turned on in response to a hold instruction when the corresponding common hold button 37 is pushed. Further, each of the LEDs is turned off in response to a hold release instruction when the corresponding common hold button 37 is pushed in the state where the LED 37a is turned on. The common hold button 37 is used to hold/release of the holding of a telephone accommodated in the private branch exchange 1.

The instruction accepted by each button provided onto the panel face is transmitted to the central processing equipment 12 through the extension telephone control devices $14_1$ to $14_m$ or the multifunctional telephone line interface circuit $16_1$ to $16_m$, and the processing is carried out in accordance with the content of the instruction.

Next, the hold control processing of the communication system of this embodiment will be described with reference to FIGS. 4 to 9.

Figure 4:
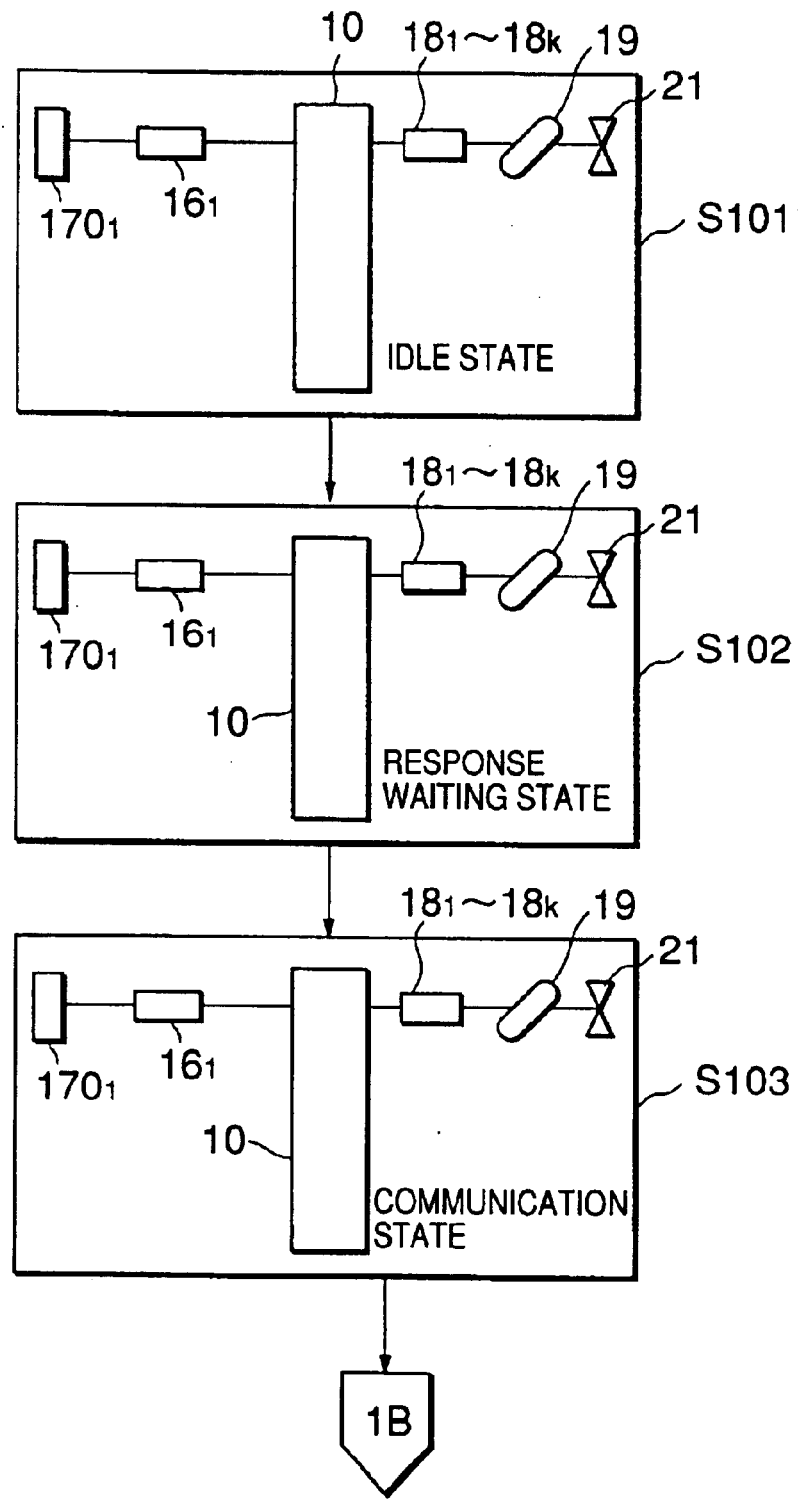
FIG. 4 is a status transition diagram until a communication path is established between an external telephone 21 and a multifunctional telephone $170_1$ in FIG. 1.

FIG. 4 is a state transition diagram until the communication channel between the external telephone 21 and the multifunctional telephone $170_1$ is established in FIG. 1.

When in a state where both the multifunctional telephone $170_1$ and the external telephone 21 are idle (no communication channel is established) (step S101), the external telephone 21 initiates a call to the multifunctional telephone $170_1$ and this call is received by any one of the office line trunks $18_1$ to $18_k$ through the public telephone network 19, the central processing equipment 12 detects the call-reception and transmits call reception control information to the multifunctional telephone line interface circuit $16_1$ connected to the multifunctional telephone $170_1$.

Upon receiving the call-reception control information, the multifunctional telephone line interface circuit $16_1$ rings the multifunctional telephone $170_1$, and waits until it receives a response from the multifunctional telephone $170_1$ (step S102).

When the hand set of the multifunctional telephone $170_1$ is lifted up in the response waiting state (step S102), the central processing equipment 12 detects the lift-up of the hand set, and controls the switch 10 to connect the call-receiving one of the central office trunks $18_1$ to $18_k$ to the multifunctional telephone line interface circuit $16_1$, whereby the communication channel is established between the external telephone 21 and the multifunctional telephone $17_1$ (step S103).

Figure 5:
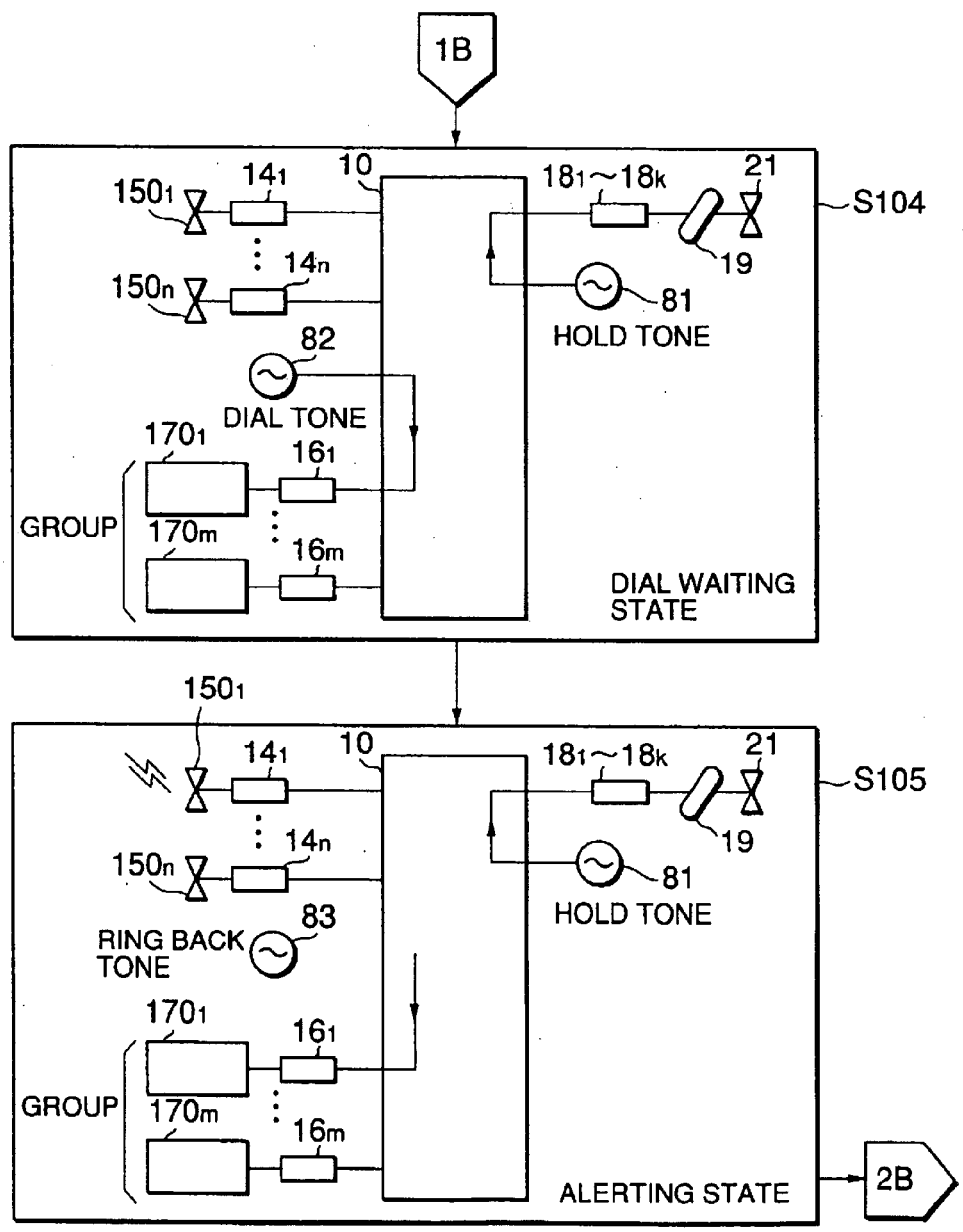
FIG. 5 is a status transition diagram until the external telephone 21 is held and then an extension telephone $150_1$ is alerted after a communication state (step S103) of FIG. 4.

FIG. 5 is a state transition diagram until the external telephone 21 is held to alert the extension telephone $150_1$ after the communication state (step S103) shown in FIG. 4.

Upon pushing the transfer button 39 of the multifunctional telephone $170_1$ in the communication state (step S103) shown in FIG. 4, the central processing equipment 12 detects the pushing of the transfer button 39 to connect the call-receiving one of the central office trunks $18_1$ to $18_k$ to a hold tone source 81 to transmit a hold tone to the external telephone 21. Further, it connects the multifunctional telephone line interface circuit $16_1$ to a dialing tone source 82 to transmit dial tone to the multifunctional telephone $170_1$, and then waits until the extension number is input through the dial button 34 of the multifunctional telephone $170_1$ (step S104).

When the extension number of the extension telephone $150_1$ is input to the multifunctional telephone $170_1$ through the dial button 34 in the dial waiting state (step S104), the multifunctional telephone line interface circuit $16_1$ transmits the extension number information to the central processing equipment 12.

Upon accepting the extension number information, the central processing equipment 12 transmits the call-reception information to the line interface circuit $14_1$ connected to the extension telephone $150_1$. Further, the central processing equipment 12 connects the multifunctional telephone line interface circuit $16_1$ to an alerting tone source 83 to transmit a ring back tone to the multifunctional telephone $170_1$.

Upon receiving the call-reception information from the central processing equipment 12, the line interface circuit $14_1$ controls the extension telephone $150_1$ to ring, and waits until it receives a response from the extension telephone $150_1$ (step S105).

Figure 6:
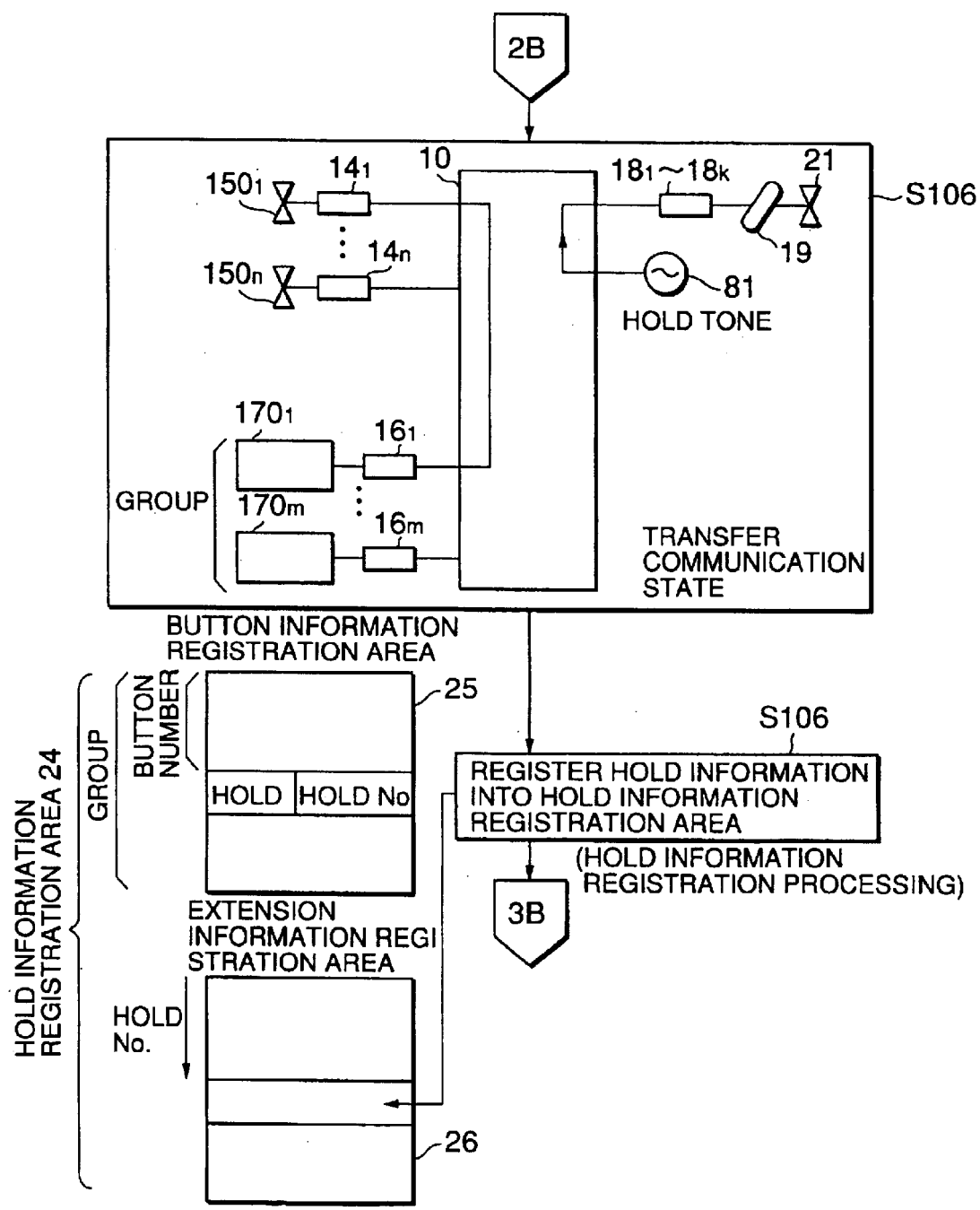
FIG. 6 is a status transition diagram until extension information of a transfer communication partner (extension telephone $150_1$) serving as a hold target is registered in the hold information registration area of a main memory device 13 after an alert state (step S105) of FIG. 5.

FIG. 6 is a state transition diagram until the extension information of a transfer communication partner (extension telephone $150_1$) serving as a hold target is registered in the hold information registration area 24 of the main memory 13 after the alerting state (step S105) shown in FIG. 5.

When the hand set 52 of the extension telephone $150_1$ is lifted up in the alerting state shown in FIG. 5 (step S105), the central processing equipment 12 detects the off-hook of the receiver, and controls the communication channel switch 10 so that the multifunctional telephone line interface circuit $16_1$ is connected to the line interface circuit $14_1$, whereby the communication path (transfer communication path) is established between the multifunctional telephone $170_1$ and the extension telephone $150_1$ (step S106).

The multifunctional telephone line interface circuit $16_1$ controls the display unit 31 of the multifunctional telephone $170_1$ to display the information of the extension telephone $150_1$ connected to the line interface circuit $14_1$ connected thereto, that is, the information of the transfer communication partner.

When any turned-off (idle-state) one of the plural common hold buttons 37 provided onto the panel face of the multifunctional telephone $170_1$ is pushed, the central processing equipment 12 executes the hold registration program 23 to register required information in the hold information registration area 24 stored in the main memory 13.

As shown in FIG. 6, the hold information registration area 24 comprises a button information registration area 25 and an extension information registration area 26. In the button information registration area 25, there is beforehand registered information representing the corresponding relationship between the button numbers of the variable function buttons 36 allocated to the common hold buttons 37 and the hold Nos (numbers) allocated to the button numbers for each of the multifunctional telephones $170_1$ to $170_m$. For each hold No, the extension information registration area 26 is provided with an area in which extension information associated with the hold No is stored.

On the basis of the hold registration program 23, the central processing equipment 12 searches from the button information registration area 25 the hold No. associated with the button number of the pushed common hold button 37 of the multifunctional telephone $170_1$, and it registers into the area corresponding to the searched hold No of the extension information registration area 26 the extension information of the extension telephone $150_1$ (information for specifying the extension number of the extension telephone $150_1$ such as identification information of the line interface circuit $14_1$ connected to the extension telephone $150_1$ or the like) which is the transfer communication partner of the multifunctional telephone $170_1$ (step S107).

The central processing equipment 12 turns on the LED 37a of the pushed common hold button 37 of the multifunctional telephone $170_1$ to emit green light. Further, it searches from the button information registration area 25 the multifunctional telephones $170_2$ to $170_m$ having the common hold buttons 37 of the same button number as the pushed common hold button 37 in the multifunctional telephone $170_1$, and turns on the LEDs 37a of the common hold buttons 37 of the same button number of the searched multifunctional telephones $170_2$ to $170_m$ to emit red light.

Figure 7:
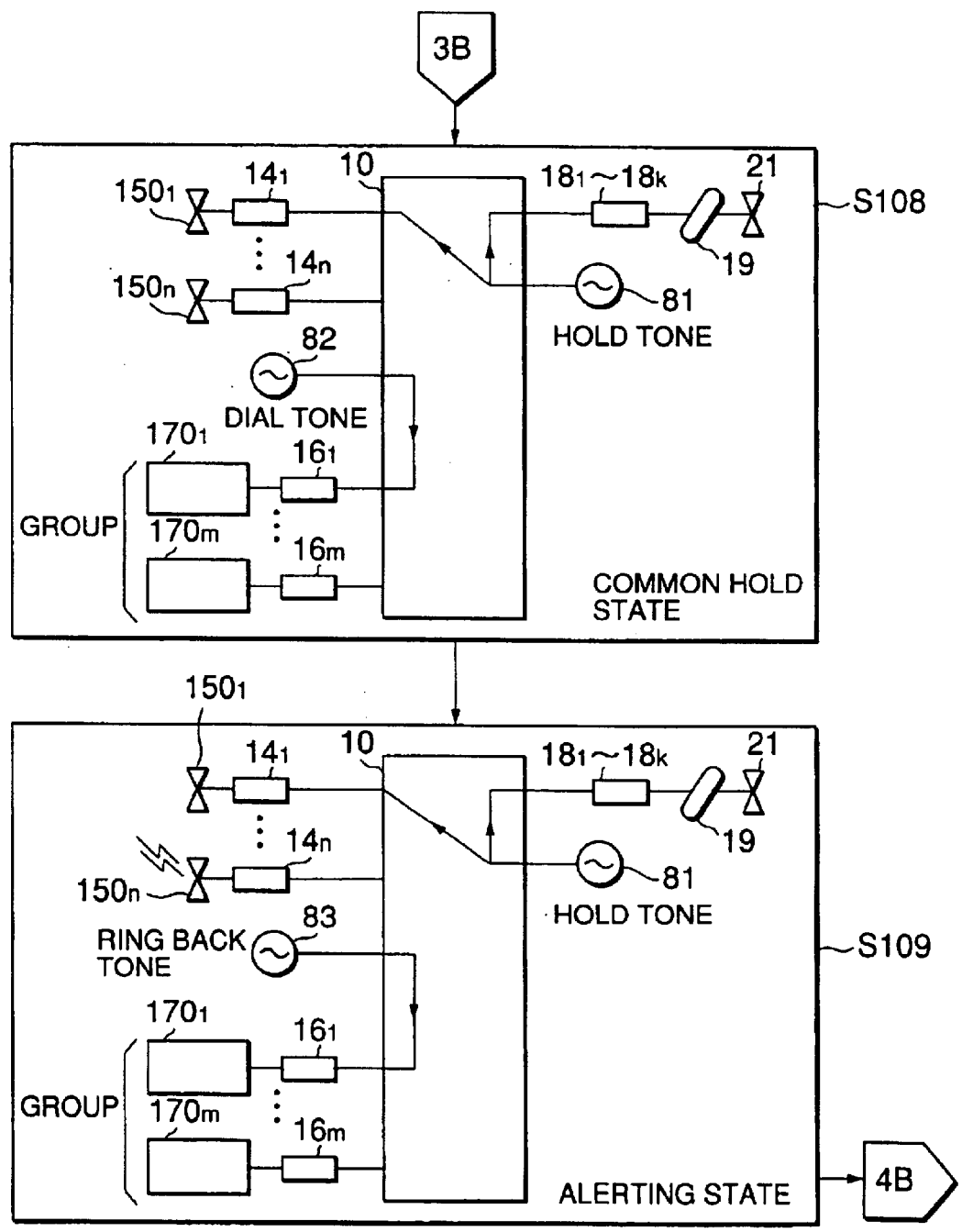
FIG. 7 is a status transition diagram until the extension telephone $150_1$ under transfer communication is held and another extension telephone $150_n$ is alerted after the hold information registration processing (step S107) of FIG. 6.

FIG. 7 is a state transition diagram until the extension telephone $150_1$ under transfer communication is held and another extension telephone $150_n$ is alerted after the hold information registration processing (step S107) shown in FIG. 6.

After the hold information registration processing (step S107) shown in FIG. 6, the central processing equipment 12 connects to the dialing tone source 82 the multifunctional telephone line interface circuit $16_1$ connected to the multifunctional telephone $170_1$ under transfer communication to transmit a dial tone to the multifunctional telephone $170_1$. Further, it connects to the hold tone source 81 the line interface circuit $14_1$ connected to the extension telephone $150_1$ of the transfer communication partner to transmit the hold tone to the extension telephone $150_1$. The central processing equipment 12 waits until the extension number is input to the multifunctional telephone $170_1$ through the dial button 34 (step S108). In this state, the hold tone is transmitted to both the external telephone 21 and the extension telephone $150_1$ (common hold state).

When the extension number of the extension telephone $150_n$ is input to the multifunctional telephone $170_1$ through the dial button 34 in the common hold state (step S108), the multifunctional telephone line interface circuit $16_1$ transmits the extension number information to the central processing equipment 12.

Upon accepting the extension number information, the central processing equipment 12 transmits the call-reception information to the line interface circuit $14_n$ connected to the extension telephone $150_n$. Further, it connects the multifunctional telephone line interface circuit $16_1$ to the alerting tone source 83 to transmit ring back tone to the multifunctional telephone $170_1$.

Upon accepting the call-reception information from the central processing equipment 12, the line interface circuit $14_n$ rings the extension telephone $150_n$ and waits until it receives a response from the extension telephone $150_n$ (step S109).

Figure 8:
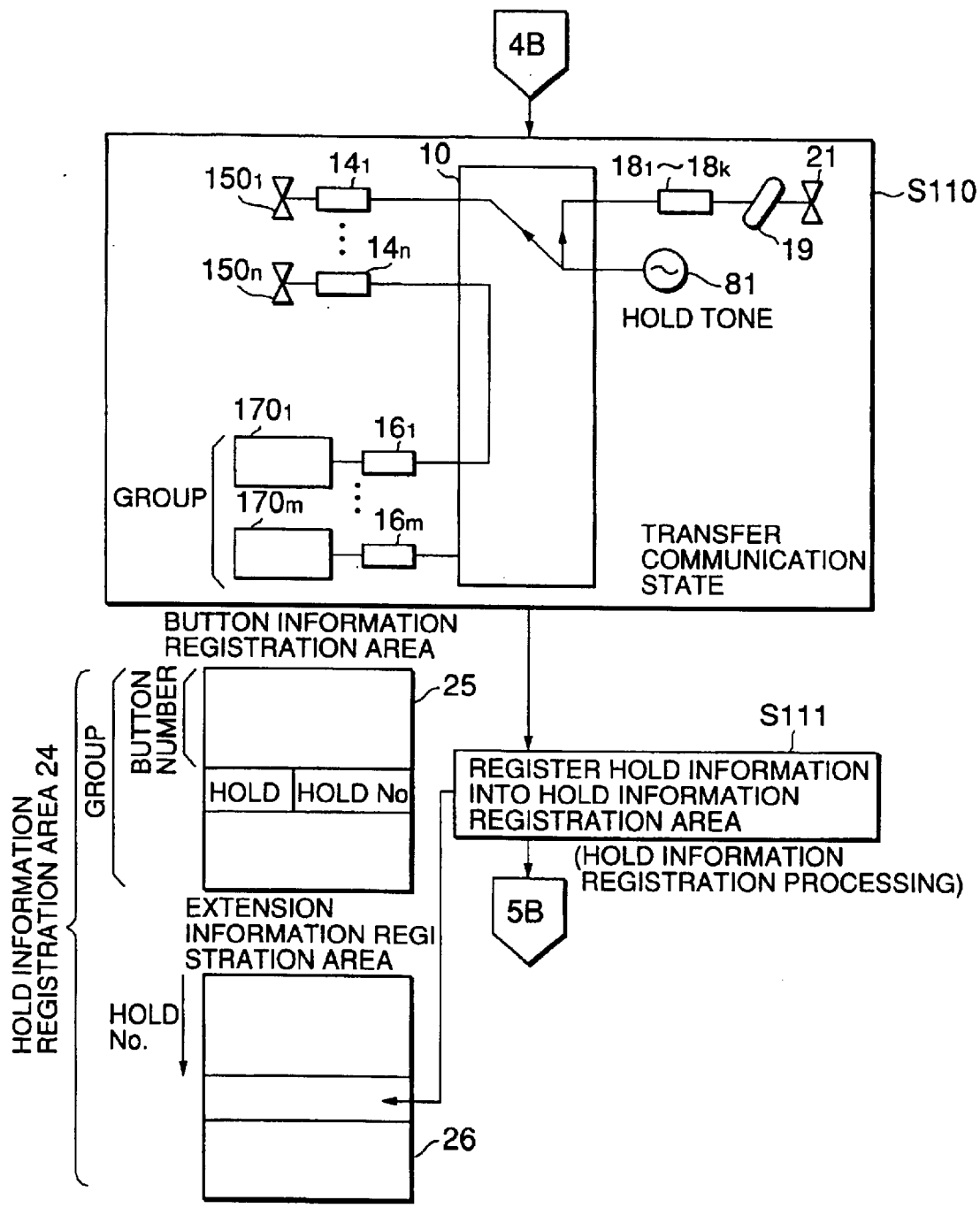
FIG. 8 is a state transition diagram until the extension information of the transfer communication partner (extension telephone $150_n$) serving as a hold target is registered in the hold information registration area of the main memory device 13 after the alerting state (step S109) of FIG. 7.

FIG. 8 is a state transition diagram until the extension information of the transfer communication partner (extension telephone $150_n$) serving as a hold target is registered into the hold information registration area 24 of the main memory 13 after the alerting state (step S109) shown in FIG. 7.

When the hand set 52 of the extension telephone $150_n$ is lifted up in the alerting state (step S109) shown in FIG. 7, the central processing equipment 12 detects the off-hook of the hand set 52, and controls the switch 10 so that the multifunctional telephone line interface circuit $16_1$ is connected to the line interface circuit $14_n$, whereby the communication path (transfer communication path) between the multifunctional telephone $170_1$ and the extension telephone $150_n$ is established (step S110).

The multifunctional telephone line interface circuit $16_1$ controls the display unit 31 of the multifunctional telephone $170_1$ to display the information of the extension telephone $150_n$ connected to the line interface circuit $14_n$ connected thereto, that is, the information of the transfer communication partner.

When any one of turned-off (idle state) common hold buttons 37 in the plural common hold buttons 37 provided onto the panel face of the multifunctional telephone $170_1$ in the transfer communication state (step S110) is pushed, the central processing equipment 12 executes the hold registration program 23 to register required information in the hold information register area 24 stored in the main memory 13.

On the basis of the hold registration program 23, the central processing equipment 12 searches from the button information registration area 25 the hold No. which is associated with the button number of the pushed common hold button 37 of the multifunctional telephone $170_1$, and registers into the area corresponding to the searched hold No. the extension information of the extension telephone $150_n$ serving as the transfer communication partner of the multifunctional telephone $170_1$ (information for specifying the extension of the extension telephone $150_n$ such as identification information of the line interface circuit $14_n$ connected to the extension telephone $150_n$ or the like) (step S111).

The central processing equipment also turns on the LED 37a of the pushed common hold button 37 of the multifunctional telephone $170_1$ to emit green light. Further, it searches from the button information registration area 25 the multifunctional telephones $170_2$ to $170_m$ having the common hold buttons 37 of the same button number as the pushed common hold button 37 in the multifunctional telephone $170_1$, and turns on the LEDs 37a of the common hold buttons 37 of the same button number in the searched multifunctional telephones $170_2$ to $170_m$ to emit red light.

Figure 9:
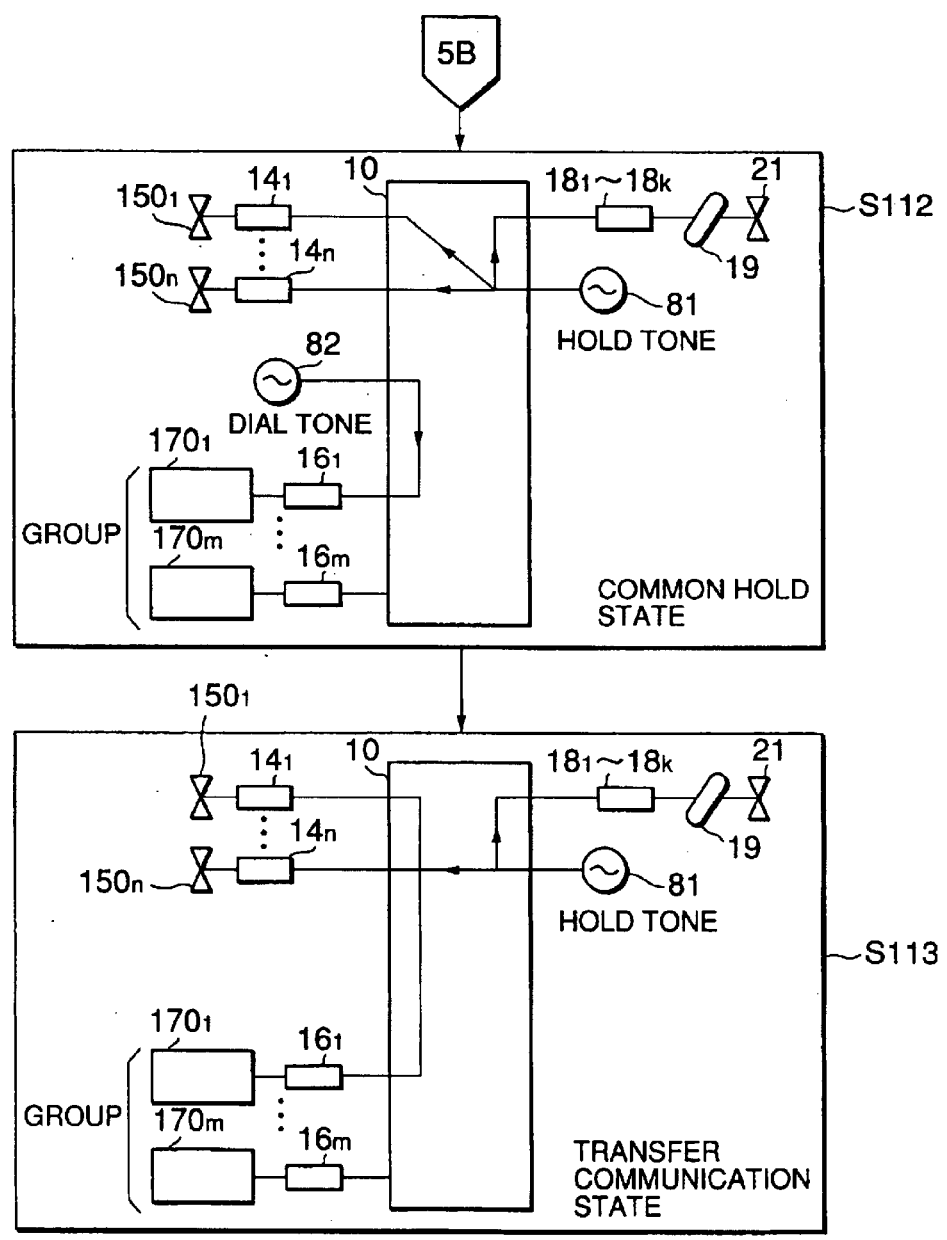
FIG. 9 is a state transition diagram until the extension telephone $150_n$ under transfer communication is held and the extension telephone $150_n$ under hold is alerted to communicate with the extension telephone $150_n$ after the hold information registration processing (step S111) of FIG. 8.

FIG. 9 is a state transition diagram until the extension telephone $150_n$ under transfer communication is held to alert and communicate with the extension telephone $150_1$ under hold after the hold information registration processing (step S111) shown in FIG. 8.

After the hold information registration processing (step S111) shown in FIG. 8, the central processing equipment 12 connects to the dial tone source 82 the multifunctional telephone line interface circuit $16_1$ connected to the multifunctional telephone $170_1$ under transfer communication to transmit dial tone to the multifunctional telephone $170_1$. Further, it connects to the hold tone source 81 the line interface circuit $14_n$ connected to the extension telephone $150_n$ of the transfer communication partner to transmit the hold tone to the extension telephone $150_n$, and waits until the extension number is input to the multifunctional telephone $170_1$ through the dial button 34 or until the common hold button 37 is pushed while the LED 37a of the multifunctional telephone $170_1$ is turned on to emit green light (step S112). In this state, the hold tone is transmitted to all the external telephone 21, the extension telephone $150_1$ and the extension telephone $150_n$ (common hold state).

When the extension numbers of the other extension telephones $150_2$ to $150_{n-1}$ are input to the multifunctional telephone $170_1$ through the dial button 34 in the common hold state (step S112), the processing is returned to the step S109 to perform the same processing.

On the other hand, when the common hold button 37 whose LED 37a is turned on to emit green light (the common hold button 37 used to hold the extension telephone $150_1$) is pushed, the hold registration program 23 is executed to delete required information from the hold information registration area 24 stored in the main memory 13.

The central processing equipment 12 searches from the button information registration area 25 the hold No. associated with the button number of the pushed common hold button 37 of the multifunctional telephone $170_1$. Further, the central processing equipment 12 searches the extension information stored in the area corresponding to the searched hold No. in the extension information registration area 26 to deletes the extension information from the area concerned, and then connects to the multifunctional telephone line interface circuit $16_1$ the line interface circuit $14_1$ specified by the information concerned (step S113), thereby establishing the communication path (transfer communication path) between the multifunctional telephone $170_1$ and the extension telephone $150_1$.

Still further, the central processing equipment 12 turns off the LED 37a (emitting green light) of the pushed common hold button 37 of the multifunctional telephone $170_1$. In addition, the central processing equipment 12 searches from the button information registration area 25 the multifunctional telephones $170_2$ to $170_m$ having the common hold buttons 37 of the same button number as the pushed common hold button 37 in the multifunctional telephone $170_1$, and turns off the LEDs 37a (emitting red light) of the common hold buttons 37 of the same button number of the searched multifunctional telephones $170_2$ to $170_m$.

The multifunctional telephone line interface circuit $16_1$ controls the display unit 31 of the multifunctional telephone $170_1$ to display the information of the extension telephone $150_1$ connected to the line interface circuit $14_1$ connected thereto, that is, the information of the transfer communication partner.

According to this embodiment, as described above, the information of the communication partner (extension telephone) under hold is registered in the hold information registration area 24, and the hold release processing is carried out on the basis of the hold information registration area 24. Since the information of the hold communication partner (extension telephone) is managed on the basis of the hold information registration area 24 as described above, a plurality of communication partners can be held for each of the telephones accommodated in the private branch exchange 1, that is, it is possible to hold the transfer communication partner and communicate with another partner.

In this embodiment, the hold communication partners to be registered in the hold information registration area 24 are limited to only the telephones accommodated in the private branch exchange 1. However, the present invention is not limited to this mode, and external telephones 21 connected to the public switched telephone network 19 may be registered in the hold information registration area 24. In this case, in each of the multifunctional telephones $170_1$ to $170_m$, an inherent button number is allocated to each transfer button 39, and the button number allocated to each of the transfer buttons 39 of the multifunctional telephones $170_1$ to $170_m$ and the hold No. corresponding to the button number are registered in advance. In the extension information registration area 26 constituting the hold information registration area 24, the public line information of the external telephone 21 (information to specify the public line of the external telephone 21 such as information of central office trunks $18_1$ to $18_k$ connected to the external telephone 21) may be registered in the area of the hold No. corresponding to the button number allocated to the transfer button 39.

As described above, according to the present invention, the communication partner under transfer communication can be held to make a communication with another extension (communication partner). Accordingly, the user can communicate with another extension communication partner without requesting a transfer communication partner to hang up.

What is claimed is:

1. A communication system comprising:
   an exchange; and
   a plurality of telephones accommodated in said exchange, wherein each of said telephones includes:
   transfer instruction accept means for accepting a transfer instruction from an operator,
   a plurality of common hold operation means for accepting a hold instruction and a hold release instruction from said operator, and
   a plurality of display means each provided in association with each of said plurality of common hold operation means, each of which accepts the hold instruction and performs display showing a "hold state" when a corresponding common hold operation means is operated, and accepts the hold release instruction and performs display showing a "no hold state" when said communication common hold operation means is operated during the display showing the "hold state" thereof,
   wherein said exchange includes:

transfer control means for holding a communication partner of one of said telephones under communication and allowing the one of said telephones to request for connection with a first forwarding address telephone, in accordance with the transfer instruction accepted by said transfer instruction accept means in the one of said telephones, hold control means for holding the first forwarding address telephone under communication with the one of said telephones whose communication partner is held by said transfer control means, to associated with a first common hold operation means as one of said plurality of common hold operation means in the one of said telephone, whose corresponding display means performs the display showing the "no hold state", making said corresponding display means corresponding to said first common hold operation means in the one of said telephones perform the display showing the "hold state" and allowing the one of said telephones to request for connection with a second forwarding address telephone, in accordance with the hold instruction accepted by said first common hold operation means, and hold release means for releasing the first forwarding address telephone held in association with said first common hold operation means, connecting the first forwarding address telephone thus released with the one of said telephones, and making said corresponding display means corresponding to said first common hold operation means in the one of said telephones perform the display showing the "no hold state" in accordance with the release instruction accepted by said first common hold operation means.

2. A communication system as claimed in claim 1, wherein said hold control means holds the second forwarding address telephone under communication with the one of said telephones whose first forwarding address telephone is held by said hold control means itself, to associate with a second common hold operation means as one of said plurality of common hold operation means in the one of said telephone whose corresponding display means performs the display showing the "no hold state", and making said corresponding display means corresponding to said second common hold operation means in the one of said telephones perform the display showing the "hold state", in accordance with the hold instruction accepted by said second common hold operation means, and wherein said hold release means releases the second forwarding address telephone held in association with said second common hold operation means, connecting the second forwarding address telephone thus released with the one of said telephones, and making said corresponding display means corresponding to said second common hold operation means in the one of said telephones perform the display showing the "no hold state", in accordance with the release instruction accepted by said second common hold operation means.

3. An exchange for accommodating a plurality of telephones each including transfer instruction accept means for accepting a transfer instruction from an operator, a plurality of common hold operation means for accepting a hold instruction and a hold release instruction from said operator, and a plurality of display means each provided in association with each of said plurality of common hold operation means, each of which accepts the hold instruction and performs display showing a "hold state" when a communication common hold operation means is operated, and accepts the hold release instruction and performs display showing a "no hold state" when said communication common hold operation means is operated during the display showing the "hold state" a thereof, said exchange comprising:

transfer control means for holding a communication partner of one of said telephone under communication and allowing the one of said telephones to request for connection with a first forwarding address telephone, in accordance with the transfer instruction accepted by said transfer instruction accept means in the one of said telephones;

hold control means for holding the first forwarding address telephone under communication with the one of said telephones whose communication partner is held by said transfer control means, to associate with a first common hold operation means as one of said plurality of common hold operation means in the one of said telephone whose corresponding display means performs the display showing the "no hold state", making said corresponding display means corresponding to said first common hold operation means in the one of said telephones perform the display showing the "hold state", and allowing the one of said telephones to request for connection with a second forwarding address telephone, in accordance with the hold instruction accepted by said first common hold operation means; and hold release means for releasing the first forwarding address telephone held in association with said first common hold operation means, connecting the first forwarding address telephone thus released with the one of said telephones, and making said corresponding display means corresponding to said first common hold operation means in the one of said telephones perform the display showing the "no hold state", in accordance with the release instruction accepted by said first common hold operation means.

4. A communication hold control method in a communication including an exchange and a plurality of telephones each of which is accommodated in the exchange and has a hold function, said exchange executing steps of:

a first step of holding a communication partner of one of the telephone a under communication and allowing said one of the telephones to request for connection with a first forwarding address telephone, in accordance with a transfer instruction accepted from said one of the telephones under communication;

a second step of holding the forwarding address telephone under communication with said telephone whose communication partner is held, to associate with a first common hold operation means as one of a plurality of common hold operation means of said one of the telephones, whose corresponding display means performs display showing a "no hold state", making said corresponding display means corresponding to said first common hold operation means of said one of the telephones perform display showing a "hold state", and allowing said telephone to request for connection with a second forwarding address telephone, in accordance with a hold instruction accepted by said first common hold operation means; and a third step of releasing the first forwarding address telephone held in association with said first common hold operation means, connecting the first forwarding address telephone thus released with said one of the telephones, and making said corresponding display means corresponding to said first common hold operation means in said one of the telephones perform the display showing the "no hold state", in accordance with a release instruction accepted by said first common hold operation means, wherein said second step holds the first forwarding address telephone under communication by the hold instruction from said one of the telephones, even if said one of the telephones already has the communication partner under holding by the transfer instruction from said one of the telephones.

* * * * *